E. W. THOMPSON.
METHOD FOR MANUFACTURING COTTON BATTING AND PRODUCT OF THE SAME.
APPLICATION FILED APR. 14, 1910.
970,971.
Patented Sept. 20, 1910.
3 SHEETS—SHEET 1.
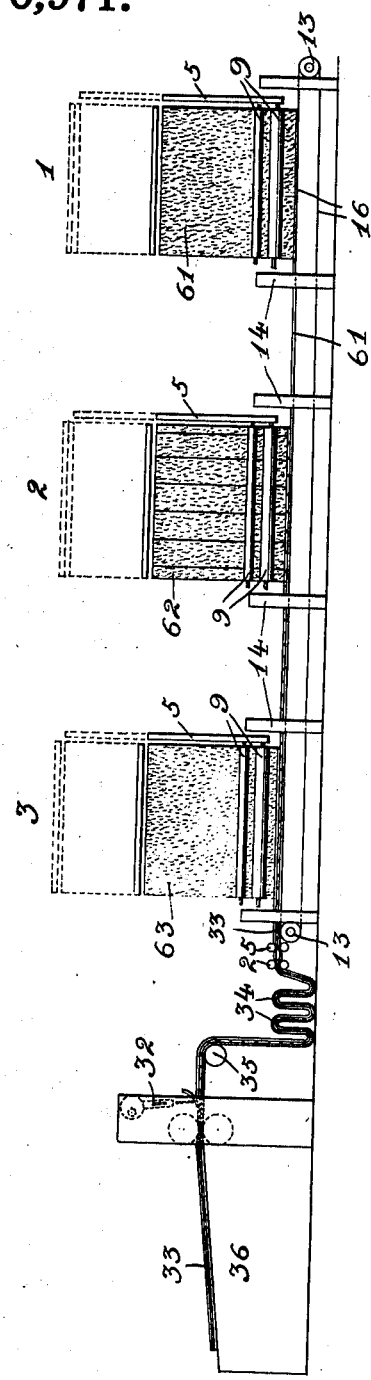
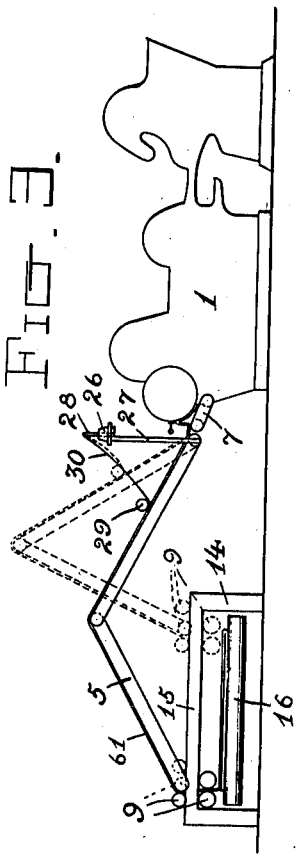

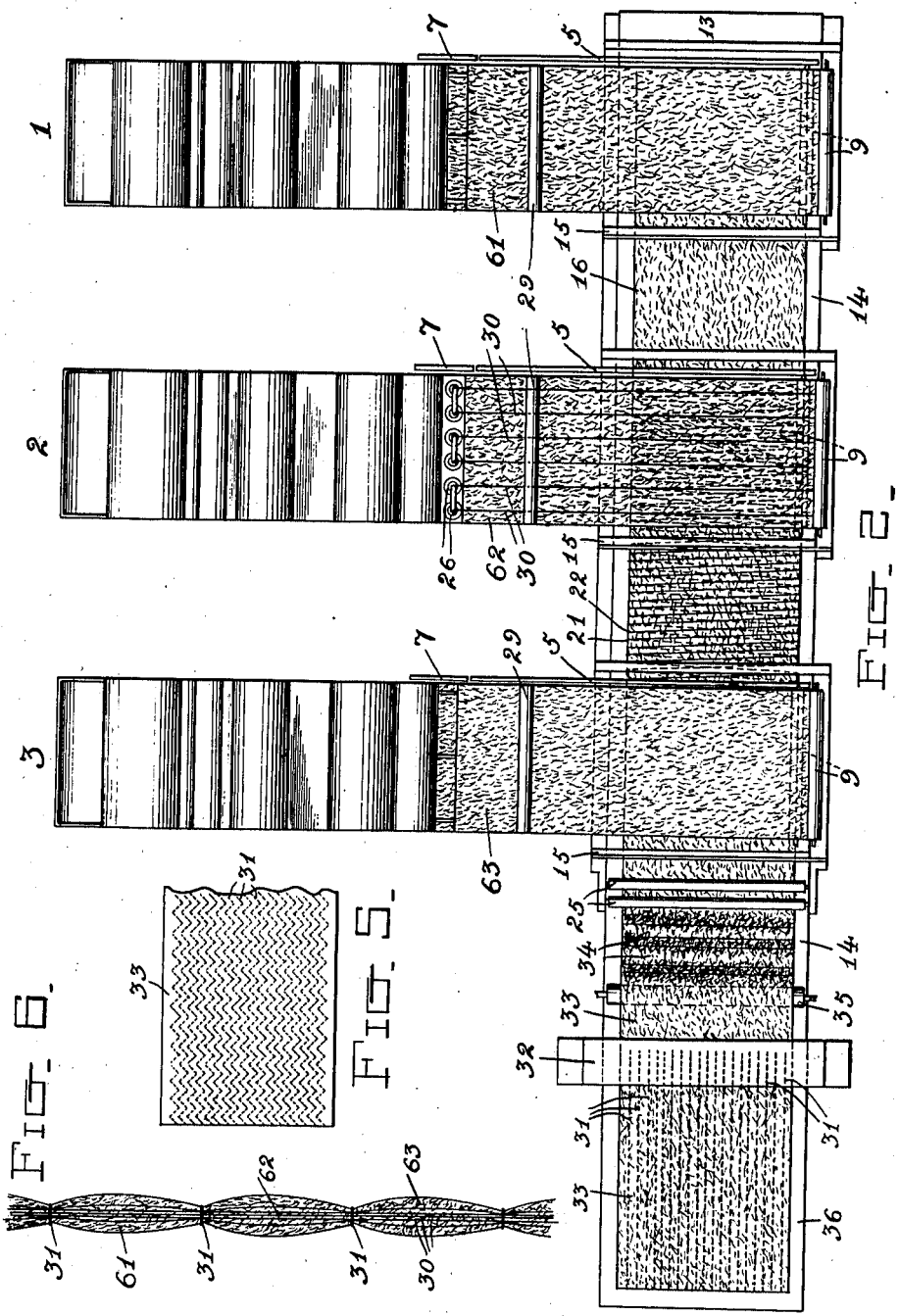

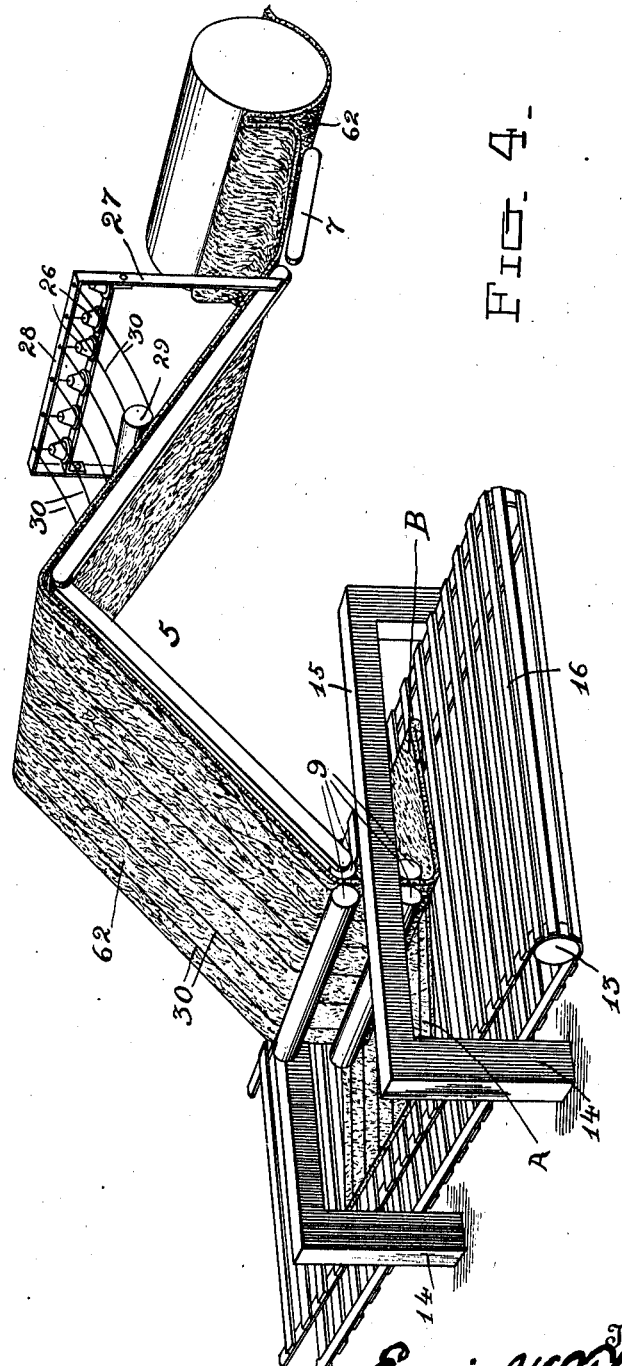

UNITED STATES PATENT OFFICE.

ERWIN W. THOMPSON, OF CHARLOTTE, NORTH CAROLINA.

METHOD FOR MANUFACTURING COTTON-BATTING AND PRODUCT OF THE SAME.

970,971.  Specification of Letters Patent.  Patented Sept. 20, 1910.

Application filed April 14, 1910. Serial No. 555,380.

*To all whom it may concern:*

Be it known that I, ERWIN W. THOMPSON, a citizen of the United States, residing at Charlotte, in the county of Mecklenburg and State of North Carolina, have invented certain new and useful Improvements in Method for Manufacturing Cotton-Batting and Product of the Same, of which the following is a specification, reference being had therein to the accompanying drawing.

This invention relates to a method for manufacturing cotton batting or the like, and for the product of such method.

My object is to provide a simple and economical method for making batting and also to provide a new article of manufacture which will be more desirable than the batting hitherto made, and especially the kind of batting used for domestic purposes, such as quilts, comforters or similar articles; and a further object is to produce an article which may be unrolled by the merchant and exhibited to customers, or may be displayed in a show window with much less liability to injury than anything that has heretofore been produced in this line.

In order to accomplish these ends my invention, therefore, consists in the peculiar steps of the method and in the product more fully hereinafter described, and then pointed out in the claims.

In the drawings I have represented one form of machine for performing the method and making the product.

In the accompanying drawings:—Figure 1 represents a front elevation of my invention, Fig. 2 a top or plan view, Fig. 3 a side elevation, Fig. 4 a perspective detail view, Figs. 5 and 6 views of details.

The mechanism now to be described is designed primarily to make a continuous sheet of reinforced batting which may afterward be cut into various lengths and put up in packages, by rolling or folding, suitable for presentation to the trade.

Figs. 1, 2 and 3 represent a series of three carding machines placed side-by-side in parallel arrangement. These machines are alike and hence a description of one will suffice for all.

Carded cotton or linters are delivered from each machine simultaneously onto a short endless apron 7 which in turn delivers it to a camelback 5. The camelback 5 is of the well known type and may be actuated by any suitable mechanism which it is not deemed necessary now to show. As the linters are delivered from the carding machine onto the camelback they form a web 61, which travels forward and is delivered off the free end of the camelback onto a long carrying-off apron 16, traveling in front of and common to all three carding machines. The free end of the camelback is equipped with the usual group of drawing-off rollers 9 adapted to reciprocate back and forth on tracks 15 which constitute part of a table 14. The apron 16 is stretched over idle rollers 13 at the opposite ends of table 14, and is timed to travel at a very slow speed relative to the back and forth movements of the camelback. The distance the carrying-off apron 16 travels during a round trip of the camelback is represented by the distance between the ends of lines 21 and 22.

25 indicates a set of four drawing-off rollers located at the left hand of the series of the machines 1, 2 and 3, as seen in Fig. 1. These rollers grip the three layers of batting and draw them all off the apron 16 together.

The drawing-off mechanism may be so timed that the camelback will make any desired number of folds, represented by lines 21 and 22, during a given time.

Web 62, which is produced by the middle machine 2, is reinforced and strengthened by the means of a series of parallel threads or yarns 30 which unwind from a series of equidistant spools 26, and fall upon the web. 27 is a standard on which the spools are supported. The spools are given the usual conical formation and each are passed through a thread leader 28. The threads 30 are not stitched in, but are allowed to rest by gravity alone on the top of the cotton web 62 and are held in contact therewith by means of a roller 29. This pressure roller 29 makes the threads grip the cotton sufficiently to draw them from the spools with the web while it is carried forward over the camelback.

The threaded middle web 62 is deposited in overlapping transverse folds on top of the passing first folded web 61 and is carried along under the third or any subsequent camelback. This third camelback deposits another folded web 63 upon the top of the second folded web 62, thereby covering and protecting the threads 30. In this way and by these means a three-ply or multiply piece of quilting 33 of cotton batting is produced. This piece is carried forward by the drawing-off rollers 25 and deposited below in folds 34 from whence it passes up and over a roller 35 to a gang sewing machine 32 which binds the layers of batting together with a series of lines of longitudinal stitches 31 and thus completes the quilting. The advantage of allowing the folds 34 to form between the drawing-off rollers 25 and the sewing machine 32 is to allow slack enough to permit the carding machines and the sewing machine to start and stop independently of each other.

36 is a table onto which the finished product is delivered.

In Fig. 5 is seen a modification wherein the stitching is made in zig-zag instead of straight lines.

Summarizing the operation of the apparatus it may be said that the carding machines 1, 2 and 3 are first filled with cotton and simultaneously set in motion. Cotton issues therefrom in the form of thin webs onto the short belts or aprons 7 whence they are transferred onto the camelbacks. The camelback of machine number 1 deposits the web back and forth transversely onto the longitudinal carrying-off-apron 16 while the latter is traveling slowly beneath in a direction at right angles to the path of the camelback. In the act of depositing the web each camelback travels back and forth across the apron 16 at a speed greatly in excess of the speed of the latter, trailing the webs with them. This action forms the overlapping folds of each web. The web 61 from the first carding machine 1 lies directly on the carrying-off apron. The web 62 from second machine 2 lies on the first web, and is carried along by it. The web from all successive machines are likewise carried on top of the previous ones, so that these successive layers of webs are built up on the carrying-off-apron to make a final bolt of the required thickness.

All layers or plies are formed exactly alike, excepting the middle layer 62 which is reinforced by the loosely laid threads 30 running crosswise of the length of the finished goods, and bound by the longitudinal series of stitches 31. This stitching gives a quilted formation and surface to the goods, as shown more clearly in Fig. 5, and when combined with the loosely spaced threads, produces an article of manufacture which possesses greater strength, softness, and durability than anything hitherto constructed for the purposes specified.

Quilt bats thus constructed may be unrolled by the merchant upon the counter and exhibited to prospective customers, and may also be exhibited, with little damage, in a show window, neither of which is practicable with any other batting.

Another advantage of my reinforced batting is that a quilt or comforter may be made with it, without the laborious process of quilting through and through, which is usual with all other bats. This bat, being already quilted needs no further work to make it hold its shape in the final quilt.

A further advantage of my construction is that a comforter or quilt can be removed from its case and cleaned and replaced, or a different one substituted.

Although I have shown and described one form of my device it is evident that it could be varied in many ways that might naturally suggest themselves to a skilled mechanic, without departing from the scope and spirit of the invention.

What I claim is:—

1. The method of making cotton batting and the like, which consists in forming a bottom or first web of batting; secondly, forming a second or middle web of batting provided with a plurality of transverse loosely laid strengthening threads; thirdly, covering the threaded batting with a top or third layer of batting; and fourthly, stitching the whole, through and through to make a series of parallel lines of stitching in longitudinal rows, to bind the transverse layers of loose threads into the fabric, thus completing a system of reinforcing the batting, and giving it strength in both directions.

2. The herein described continuous method of making cotton batting and the like of indefinite lengths, which consists in forming a plurality of webs, incorporating into one of the webs during its process of formation continuous loose strengthening threads, superposing the webs, and then stitching them together along lines which cross the said strengthening threads.

3. The method of making cotton batting and the like, which consists in first laying a plurality of loose artificial threads onto a web of batting; secondly, covering the threaded web with a top and with a bottom layer of batting, and thirdly stitching the whole together.

4. A method of making cotton batting and the like, which consists of forming a bottom web, forming a middle web with loose strengthening threads therein, then covering the threaded web and then uniting the two webs by stitching with a top web of batting.

5. A new article of manufacture for quilts, comforters, and the like, which comprises a layer or web of batting transversely strengthened by continuous threads passing back and forth crosswise of the layer or web and lines of stitching through the batting extending in the direction of the length of the batting.

6. A new article of manufacture for quilts, comforters and the like, which comprises a layer or web of batting strengthened by continuous threads incorporated into the web, such web being folded back and forth obliquely to the longitudinal line of the finished batting, another layer of batting in superposed relation to the strengthened layer or web and longitudinal lines of stitching uniting the superposed layers.

7. A new article of manufacture for quilts, comforters and the like, which consists of a central layer of transversely threaded batting located between two layers of plain batting, in combination with longitudinal lines of stitching at intervals apart uniting all the layers.

8. A new article of manufacture consisting of a middle layer of transverse loosely threaded batting incorporated between two layers of unthreaded plain batting and rows of longitudinal stitches through all the layers.

9. As a new article of manufacture for quilts, comforters and the like, a cotton bat or sheet provided with transverse loose continuous artificial threads, in combination with covering bats upon its opposite sides and rows of longitudinal equidistant stitches through all the bats.

In testimony whereof I affix my signature in presence of two witnesses.

ERWIN W. THOMPSON.

Witnesses:
A. H. JASSPOR,
HUGH TORRANCE.